United States Patent
Bergeron et al.

(10) Patent No.: US 6,609,228 B1
(45) Date of Patent: Aug. 19, 2003

(54) LATCH CLUSTERING FOR POWER OPTIMIZATION

(75) Inventors: Paul H. Bergeron, South Burlington, VT (US); Keith M. Carrig, Essex Junction, VT (US); Alvar A. Dean, Groton, MA (US); Roger P. Gregor, Endicott, NY (US); David J. Hathaway, Underhill Center, VT (US); David E. Lackey, Jericho, VT (US); Harold E. Reindel, Williston, VT (US); Larry Wissel, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 09/713,571

(22) Filed: Nov. 15, 2000

(51) Int. Cl.⁷ .............................................. G06F 17/50
(52) U.S. Cl. ...................................................... 716/2
(58) Field of Search ............................. 716/2, 6, 8–10, 716/14, 16, 18; 713/400; 703/19; 438/129; 326/47, 93, 101

(56) References Cited

U.S. PATENT DOCUMENTS

| | | |
|---|---|---|
| 4,855,958 A | 8/1989 | Ikeda |
| 5,072,132 A | 12/1991 | Samaras et al. |
| 5,208,764 A | 5/1993 | Rusu et al. |
| 5,245,311 A | 9/1993 | Honma |
| 5,307,286 A | 4/1994 | Rusu et al. |
| 5,396,129 A | 3/1995 | Tabira |
| 5,557,779 A * | 9/1996 | Minami .......................... 716/6 |
| 5,719,783 A | 2/1998 | Kerzman et al. |
| 5,815,008 A | 9/1998 | Williamson, III et al. |
| 5,917,729 A | 6/1999 | Naganuma et al. |
| 5,999,716 A | 12/1999 | Toyonaga |
| 6,005,412 A | 12/1999 | Ranjan et al. |
| 6,286,128 B1 * | 9/2001 | Pileggi et al. ................. 716/18 |

FOREIGN PATENT DOCUMENTS

JP          09185645 A          7/1997

OTHER PUBLICATIONS

IBM Technical Disclosure Bulletin, Method for Optimizing Clock Trees on VLSI Chips, Jan. 1991, pp. 288–291.

* cited by examiner

*Primary Examiner*—Vuthe Siek
*Assistant Examiner*—Naum Levin
(74) *Attorney, Agent, or Firm*—McGinn & Gibb, PLLC; Richard M. Kotulak, Esq.

(57) ABSTRACT

A method and structure of clock optimization including creating an initial placement of clock feeding circuits according to clock signal requirements; identifying clusters of the clock feeding circuits, wherein each cluster includes a distinct clock signal supply device to which each clock feeding circuit within the cluster is connected; changing pin connections between the clock feeding circuits and clock signal supply devices to switch selected ones of the clock feeding circuits to different clusters to reduce lengths of wires between the clock feeding circuits and the clock signal supply devices within each cluster; and adjusting positions of the clock feeding circuits within design constraints to further reduce the lengths of the wires.

21 Claims, 4 Drawing Sheets

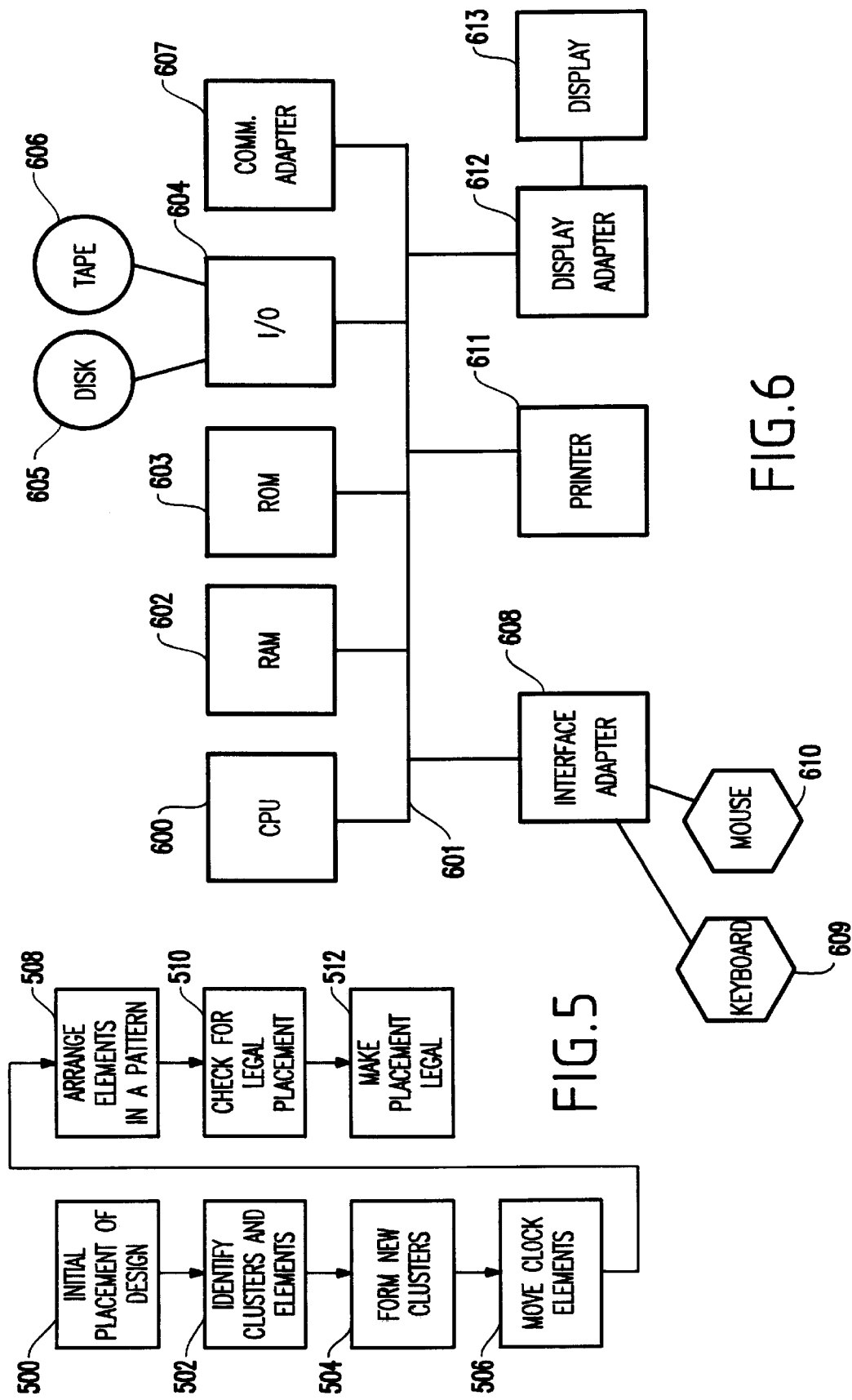

LATCH CLUSTERING FOR POWER OPTIMIZATION

BACKGROUND OF THE INVENTION

1. Field of the Invention

The present invention generally relates to integrated circuit design and more particularly to a system and method that clusters latches in integrated circuits to reduce power consumption.

2. Description of the Related Art

Clocks consume a large portion of the power in integrated circuit chips since they switch more frequently than other devices. The dynamic power consumption (the dominant portion for CMOS circuits) and the "crossover" power (due to transient DC paths through static CMOS circuits when both pull-up and pull-down devices are active) are both proportional to switching frequency. Generally, dynamic power consumption of a net equals one-half the capacitance multiplied by the voltage squared and the net switching frequency. This is reflected as $(½C)V^2F$, where C is capacitance, V is voltage and F is net switching frequency. Reducing the clock net wiring will reduce capacitance and, therefore, reduce chip power consumption.

Most existing clock optimization methods operate after the circuits on a chip have been positioned and assume a fixed placement for the latches being driven by the clock. These methods alter the connections of clock nets to latches, the number, power level, connections, and placement of clock tree elements (e.g., buffers, clock gates, and clock splitters), and the routing and width of the clock nets. After or during clock optimization, some adjustments are made to the placement to accommodate the clock tree changes.

Therefore, there is a need for a system and method of clustering clock devices that decreases power consumption of the overall circuit.

SUMMARY OF THE INVENTION

It is, therefore, an object of the present invention to provide a structure and method for clock optimization including creating an initial placement of clock feeding circuits according to clock signal requirements, identifying clusters of the clock feeding circuits (each cluster includes a distinct clock signal supply device to which each clock feeding circuit within the cluster is connected), changing pin connections between the clock feeding circuits and clock signal supply devices to switch selected ones of the clock feeding circuits to different clusters to reduce lengths of wires between the clock feeding circuits and the clock signal supply devices within each cluster, and adjusting positions of the clock feeding circuits within design constraints to further reduce the lengths of the wires.

Adjusting the positions of the clock feeding circuits includes moving the clock feeding circuits toward the clock signal supply device of each cluster to a point where a first force pulling each clock feeding circuit toward the clock signal supply device equals a second force pulling the clock feeding circuit toward an original clock feeding circuit location. The first and second forces are derivatives of cost function components. In addition, the step of identifying the clusters includes identifying subclusters within the clusters, the method further includes moving the clock feeding circuits toward centroids of the subclusters. Adjusting the positions also includes moving each of the subclusters as a group without changing relative positions of the clock feeding circuits within the subclusters, moving logic devices to minimize a cost function, and moving existing circuits to accommodate for the adjusting to reduce local wiring congestion.

It is a further embodiment the present invention provides a method of clock optimization that including creating an initial placement of clock feeding circuits according to clock signal requirements, identifying clusters of the clock feeding circuits (wherein each cluster includes a distinct clock signal supply device to which each clock feeding circuit within the cluster is connected), and changing pin connections between the clock feeding circuits and clock signal supply devices to switch selected ones of the clock feeding circuits to different clusters to reduce lengths of wires between the clock feeding circuits and the clock signal supply devices within each cluster. The pin connections are changed so as to minimize a cost function associated with moving the clock feeding circuits from an original clock feeding circuit location.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a flowchart illustrating a preferred embodiment of the invention;

FIG. 6 is a schematic diagram of a hardware embodiment of a preferred application of the invention;

DETAILED DESCRIPTION OF PREFERRED EMBODIMENTS OF THE INVENTION

As mentioned above, dynamic power consumption of a net equals one-half the net capacitance multiplied by the voltage squared and the net switching frequency, or $(½C)V^2F$. Reducing the clock net wiring will reduce capacitance and, therefore, reduce chip power consumption. The objective of clustering latches together for power reduction has to be balanced with the perturbation caused by moving latches toward a central location. From a clock perspective, the clock wire lengths and capacitance will be minimized if all latches are clustered together into a "row" or "column". However, depending on the cluster size, this methodology may move the latches very far away from where they would naturally reside per the logic that they serve.

As the foregoing suggests, dynamic power consumption and crossover power loss are both proportional to the switching frequency. Clock drivers and latches switch more frequently than other devices. Indeed, the clock devices switch twice every clock cycle, while devices associated with other nets may switch every few clock cycles. Therefore, conserving power in clock trees will produce more power savings for the chip as a whole. For these reasons, the invention places special emphasis on the latches in the clock trees (with less regard to other devices) to reduce chip power consumption.

As also mentioned above, most existing clock optimization methods operate after the circuits on a chip have been positioned and assume a fixed placement for the latches being driven by the clock. These conventional methods alter the connections of clock nets to latches, the number, power level, connections, and placement of clock tree elements (e.g., buffers, clock gates, clock splitters, latches, etc.), and the routing and width of the clock nets.

The invention also operates on a placed design and includes post-optimization adjustments. But instead of assuming fixed latch locations, the invention allows the latches to move. Therefore, the invention not only alters the connections of the clock tree to the latches, but it also moves the latches to minimize the wiring length (and thus minimize the capacitance). In addition, the invention uses a cost function to minimize the impact of this latch movement on the placement.

The invention starts with a placed design and performs a clock optimization in which the allowable netlist changes include movement of latches. This optimization may be performed using a variety of different cost function driven methods, including simulated annealing.

Figure 2:
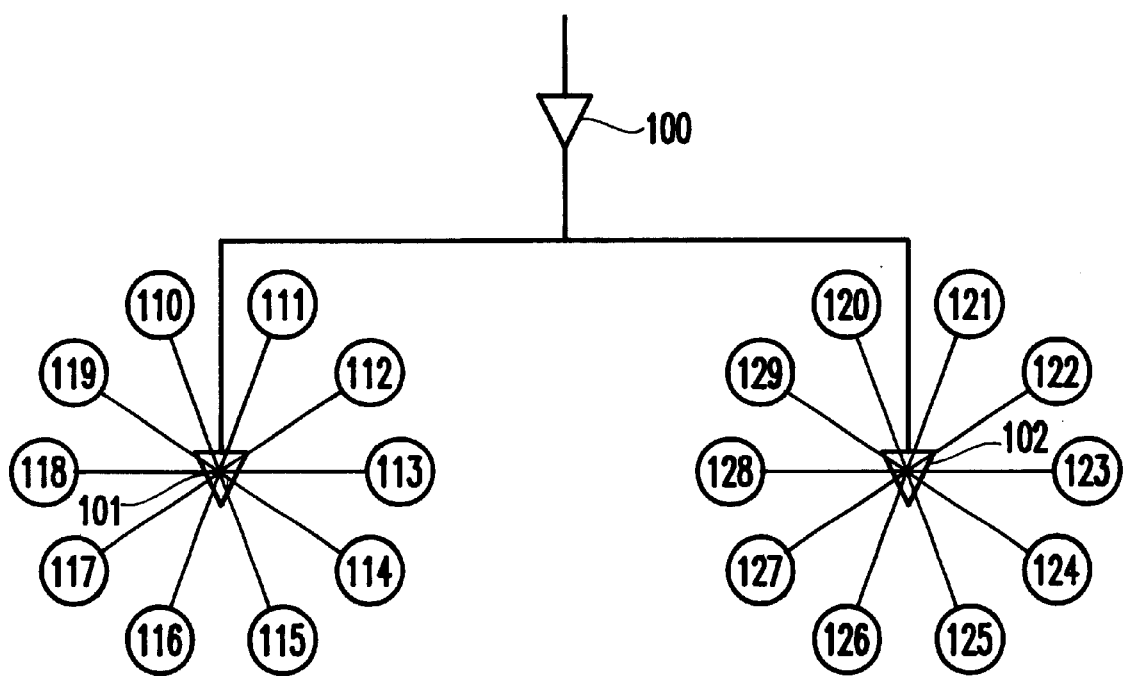
FIG. 2 is a schematic diagram of the clock elements shown in FIG. 1 having their connections altered.

If the optimization method needs to select latches (e.g., to form a cluster) based on location, the invention will select them based on their location in the original placement. Similarly, if the optimization method needs to change the connections of latches to drivers, or if it needs to evaluate the quality of a particular configuration, the invention will adjust the locations of the latches so that they are clustered around the clock tree element driving them (e.g., as shown in FIG. 2).

This is preferentially done by sorting the original locations of the latches of a single cluster in the configuration to be evaluated according to their y coordinate (for vertically arranged latch clusters) or their x coordinate (for horizontally arranged latch clusters), gathering the latches into a cluster ordered according to the previously determined sort order, and then placing that cluster such that the mean x and y locations of the clustered latches equals the mean x and y locations of the original latch locations, respectively.

The invention preferentially uses a circuit library containing a large number of different drive strengths for the elements included in the clock tree. In one embodiment, this is accomplished by having a large number of predefined discrete circuits or it can be performed by providing a parameterized circuit which can be instantiated in different sizes to provide different drive capabilities. With such a library, the invention preferably changes the size of the clock tree element driving the latch cluster to achieve a uniform delay to all latch clusters.

The clock tree element driving the cluster is preferably placed in the middle of the cluster (to minimize RC effects within the latch cluster), or at the position within the cluster which is closest to the source of the net driving the clock element to minimize clock tree wiring (and RC effects on the net driving the clock element) and hence reduce power consumption. These objectives cannot, in general, be achieved simultaneously, so a location may be chosen for the clock element which is a compromise between them. For example, the clock tree element may be placed at the closest location in the cluster to the source of the net driving the clock element subject to a limit on the RC delay from the driver to any latch in the cluster.

Figure 7:
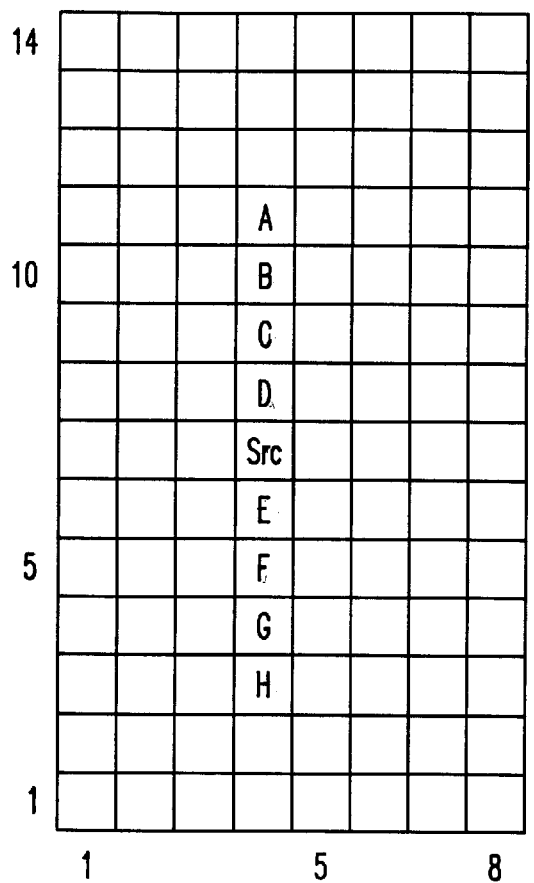
FIG. 7 is a diagram showing the initial locations of a number of latches.
Figure 8:
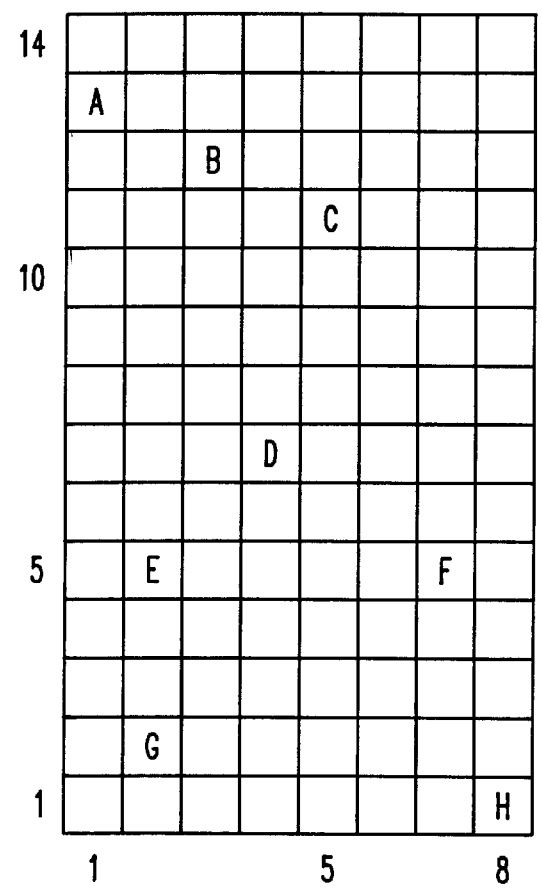
FIG. 8 is a diagram showing the locations of the latches in FIG. 7 after clustering.

An important feature of the invention is the computation of the cost function when moving the latches, buffers, splitters, drivers, etc. More specifically, the invention achieves a layout with a minimized cost function. The invention includes a factor relating to the distance the latches were moved from their original locations (e.g., the sum of the squares of the distances between the original and new latch locations) when computing the cost factor. FIG. 7 shows a set of latches A-H for which the cost of clustering is to be computed. The mean X location from the origin of these latches is $(1+2+2+3+4+5+7+8)/8=4$. Their mean Y location from the origin is $(1+2+5+5+7+11+12+13)/8=7$. If the latches are to be placed in a vertical column, the are sorted by their Y coordinate, giving an order (from highest to lowest Y coordinate value) of A, B, C, D, E, F, G, H. The source clock tree element Src which is to drive the latch cluster will be placed in the center of the cluster, i.e., at the mean X and Y location, and the latches will be placed vertically above and below this sourcing element according to their Y coordinate. The result is shown in FIG. 8. The cost function for this clustering would be the sum over all latches of the square of the distance between the initial and final location. For example, for A, the original location was (1, 13) and the final location is (4, 11), so the cost contribution due to A is $(4-1)^2+(13-11)^2$, or 13. The total cost function would then be $(4-1)^2+(13-11)^2+(4-3)^2+(12-10)^2+(5-4)^2+(11-9)^2+(4-4)^2+(8-7)^2+(4-2)^2+(6-5)^2+(7-4)^2+(5-5)^2+(4-2)^2+(4-2)^2+(8-4)^2+(3-1)^2$, or 66. This cost would be added to the costs of other clusters for a particular clock tree configuration, and compared with the total costs of other configurations (e.g., configurations in which certain sinks were assigned to different clusters). These total costs would be compared according to the optimization method used. For example, if simulated annealing were used, a change in the clock tree configuration would be made, the difference in cost due to that change would be calculated, and the change would be accepted or rejected probabilistically depending on the current value of the temperature value of the simulated annealing.

Using the large library described above, the invention preferably does not need a cost function factor related to balancing the size of the clusters. Balancing of clusters is not needed because different size drivers may be chosen to account for variations in cluster size. In one embodiment, the invention includes a cost function factor related to the RC delay of the clock net(s) driving the latch cluster.

The invention can also be used to limit the size of clusters (e.g., to determine how many leaf level clock tree elements will be needed to drive all the latches in the design). This aspect of the invention allows the designer to establish a limit on the size of each cluster (to limit RC delay or to accommodate for an upper bound on the drive strength of the available clock tree elements). The invention also allows the designer to set a limit on the distance any latch can be moved to be incorporated into a cluster (a similar result will be achieved by limiting the region covered by a latch cluster). The designer is presented with various options through any common graphic user interface. In a typical implementation of the method, the number of clock tree elements driving clocks directly to latches (without other intervening clock tree elements) is determined through an initial greedy assignment. A latch is chosen to seed a cluster, and the closest latches are added to the cluster until some criteria is met, e.g., the size of the cluster reaches some bound, or the capacitive load of the cluster reaches some bound. The method would then move latches between clusters to optimize the cost function, subject to constraints. For example, a trial move of a latch from one cluster to another might be made. The new placements of all latches in both the cluster from which the latch is being removed and the cluster to which it is being added would then be determined, as described above. If a distance limit is being imposed on the movement of a latch, the invention determines whether any latch had moved farther than this distance (from its original location before any clustering), and if so the trial move would be rejected. Similarly, if the size of the destination cluster exceeds an imposed bound because of the move, it is rejected. The total cost function of the source and destination cluster are then recomputed and compared with their value before the trial move. If the cost is improved, the move is accepted. If the cost is made worse, the move might be rejected, or it might be accepted probablistically according to a simulated annealing algorithm. This is repeated for a large number of trial moves to improve the overall cost function. The moves to try can be chosen randomly according to a simulated annealing algorithm, or chosen more methodically by successively trying to move each sink to each cluster within its allowed move radius.

Figure 1:
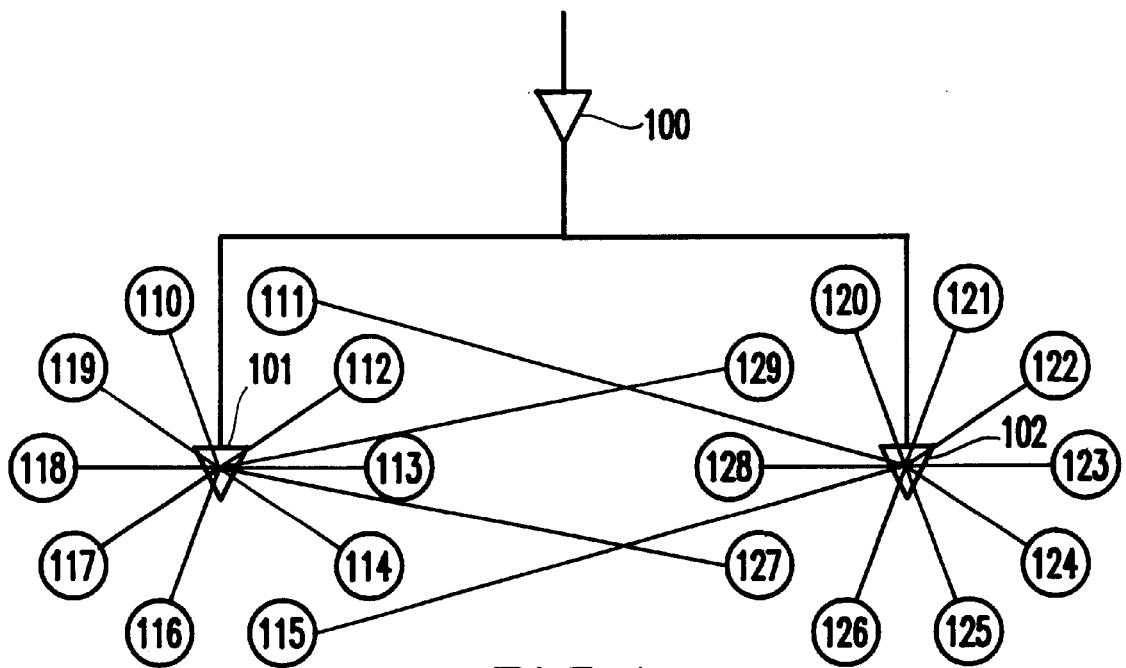
FIG. 1 is a schematic diagram of the clock elements within a circuit layout.

For example, a small portion of a clock tree is shown in FIG. 1. A clock splitter 100 supplies a clock signal to splitters 101, 102, which in turn supply the clock signal to latches 110–119 and 120–129, respectively. Note that in FIG. 1 splitter 101 supplies a clock signal to latch 127 and 129. Similarly, splitter 102 supplies a clock signal to latch 111 and 115.

The invention clusters the latches that surround the splinters to achieve the structure shown in FIG. 2. More specifically, in FIG. 2 the latches are connected to the splitter to which they are closest to minimize the wiring length.

Figure 3:
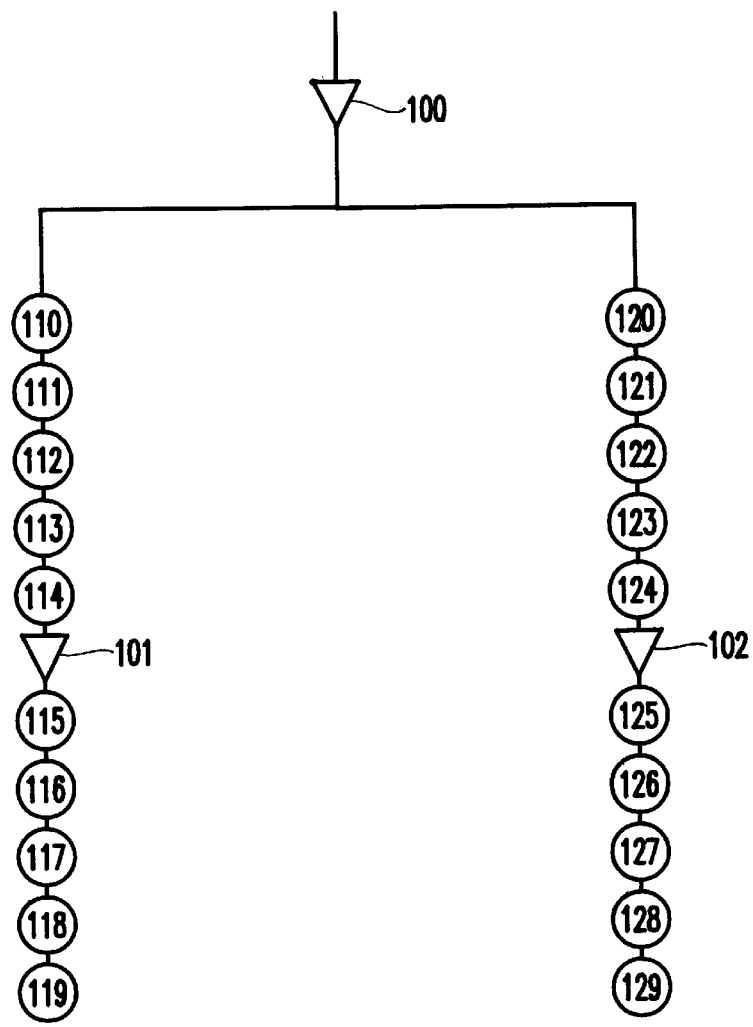
FIG. 3 is a schematic diagram of the clock elements shown in FIG. 2, being arranged in column.

In addition, as shown in FIG. 3, the invention moves the latches so that they are in closer proximity to their respective splitter. The invention preferably constructs linearly arranged clusters of latches (arranged horizontally or vertically) such that the clock pins are aligned in a straight line to minimize the clock wiring needed to connect them and also reduce the impact on wiring congestion. If latches require multiple clocks, the invention preferentially uses latches in which the spacing and ordering of the pins within each latch is the same in the direction perpendicular to the axis of the constructed latch clusters, allowing one straight wire to be used to connect up each clock within the cluster.

While the above discussion refers to latches, it would be understood by one ordinarily skilled in the art that the invention is equally applicable to a clock tree feeding flip-flops, dynamic logic circuits, or any other clocked element. In addition, the invention permits the designer the option of including logic elements into the cluster along with the clock elements to reduce the overall movement cost. Therefore, the clock elements 110–129 would, in this embodiment of the invention, actually represent clumps of logic and clock elements. For example, elements 110 and 111 might have originally been placed some distance (say 5) to the left of their final clustered locations. If a critical path goes from element 110 to an AND gate and from there to element 111, the placement program would preferentially have placed these elements (110, 111, and the AND gate) close to each other. If the AND gate were left in its original location when latches were moved to the cluster, the critical path would have two unnecessary wires of length 5 (from 110 to the AND gate and from the AND gate back to element 111). If instead the AND gate were clumped with one of these elements (say 110) and moved with it when the cluster was formed, this increase in critical path length could have been avoided.

The net effect clusters not only the clock elements, but also the logic, around drivers. The overall density is the same, but it is non-uniform. So the local wiring ends up within the clusters, and the global wiring is positioned between clusters. The invention also aligns the clumps into groups vertically and horizontally to increase the chances of getting straight global wiring runs.

The invention improves power conservation by clumping logic with latches to which they are connected by high switching nets, since a reduction in capacitance on a high switching net will give a greater power savings than an equal capacitance reduction on a low switching net.

Further, as would be known by one ordinarily skilled in the art given this disclosure, the invention can move the latches to any position desirable (e.g., into horizontal rows, into a "cross" configuration, i.e., along a pair of intersecting horizontal and vertical lines, or into tightly grouped circular clusters), depending upon wiring design requirements, so long as the latches are closely spaced (to conserve power).

In another aspect, by exploiting the existing topology of the latches in a cluster before moving them, the invention finds sub-clusters within the cluster that are highly related (e.g., are in close physical proximity). With the invention, these highly related sub-clusters are not allowed to move freely at the cluster level.

Figure 4:
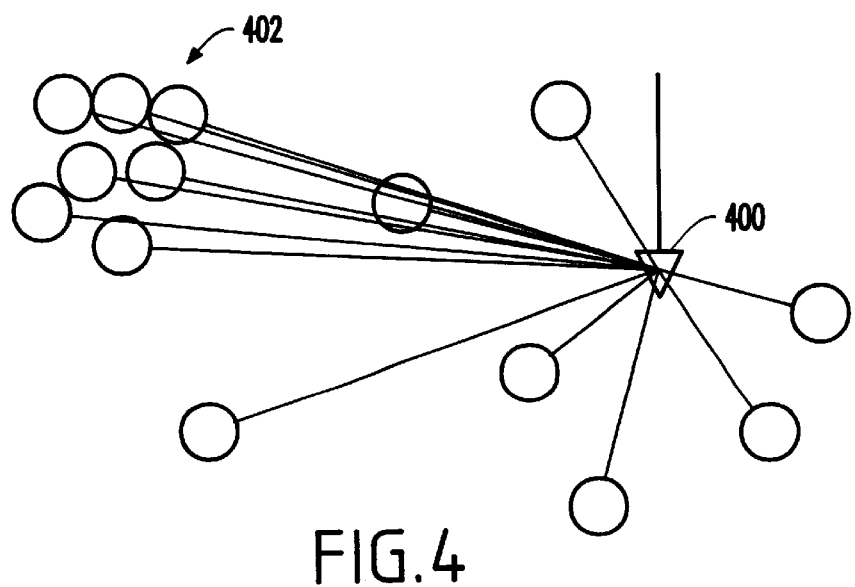
FIG. 4 is a schematic diagram of clock elements within a circuit illustrating the grouping performed by the invention.

For example, as shown in FIG. 4 a cluster of latches connected to a splitter 400 include a sub-cluster of latches 402 that are very close together. In the example shown in FIG. 4, the sub-cluster 402 is in the geometrical corner of the cluster and fairly far away from the cluster centroid (e.g., the approximate location of splitter 400). The invention draws the latches in the sub-cluster 402 as close together as possible and treats the sub-cluster 402 as a single unit that is moved around as a whole when calculating the cost functions associated with moving the latches in the cluster. Because the subcluster will contain multiple latches, the sum of the movement cost functions for these latches will heavily penalize any movement away from the original sub-cluster centroid, and sub-cluster will not end up being moving much as a whole.

The approach shown in FIG. 4 reduces the complexity of the cost function computation and yields the best compromise between the latch logic affinity and clock net wire minimization for power reduction. The cost function computation cost is reduced because the number of sub-clusters within the cluster is smaller than the original number of elements in the cluster (the sum of the numbers of elements in all the sub-clusters), and thus the number of computations required for each cost function update is reduced. The magnitude of the cost function (the total movement of latches required to achieve clustering) is less than would be expected if all latches in all sub-clusters were gathered into a single cluster because each sub-cluster spans a small area, and hence the latches within it will each have to move a smaller distance. The total clock wiring is still reduced over the original unclustered configuration (albeit not as much as with a single central cluster), since the wiring within each sub-cluster is very small, and only a single wire is needed to feed from the driving clock element to each sub-cluster.

The cluster and sub-cluster shown in FIG. 4 form a two-level hierarchy. As would be known by one ordinarily skilled in the art given this disclosure, this could be extended to an N-level hierarchy (i.e., clusters of clusters of sinks). In addition, while FIG. 4 illustrates only one sub-cluster 402, in practice many sub-clusters can be formed within a give cluster.

With the invention, after the conventional clock optimization process is completed, placement adjustments are performed to ensure that all elements have legal placements (e.g., non-overlapping circuits, etc.). During these adjustments the latch clusters generated during clock optimization are kept together and, if moved, are moved as a single entity, maintaining the relative locations of the clock tree element and latches comprising the cluster. The placement adjustment may be done through some perturbation process (moving circuits to legalize the placement) or may entail completely replacing the design, with the latch clusters now treated as single entities. Therefore, in this embodiment, once the invention establishes a power conserving positioning scheme for a given cluster, the relative position of the elements within a cluster is not changed. However, the cluster as a whole may be relocated.

Figure 9:
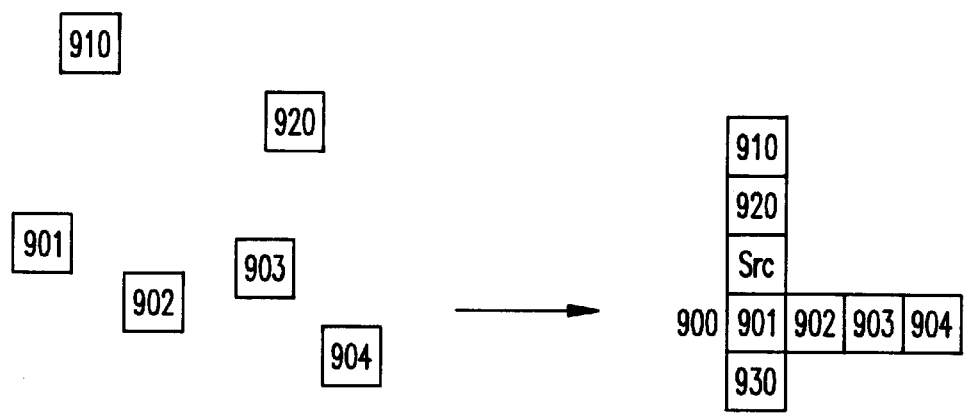
FIG. 9 is a diagram showing the use of an N-bit latch.

While the foregoing discusses clustering discrete latch circuits from a library, the invention could equally make use of predesigned N-bit latch circuits (N being equal to the number of latches included in the cluster). In this aspect of the invention, instead of including a latch in a cluster, the invention moves the data connections of the latch to the appropriate bit of such an N-bit library element. This can be considered an instance of the sub-clustering method described above, where the sub-cluster is a predesigned library element. FIG. 9 shows an example of this, where the 4-bit register 900 is created by clustering individual latches 901, 902, 903, and 904, and is clustered with latches 910, 920, and 930. The clock pin for the 4-bit latch 900 is assumed to be in the area of sub-latch 901 in this example.

The original latches are thus replaced by this N-bit latch circuit. Such a library element would most likely make better use of low voltage internal signals, since it would be less susceptible to noise due to shorter length and better controlled environment. However, even if the latches in a cluster are not replaced by a single library element, the short, controlled wiring within the cluster formed by the invention makes it easier to use methods such as isolated clock wires to further reduce clock power and variability.

FIG. 5 is a flowchart illustrating one embodiment of the invention. More specifically, in item 500, the invention performs an initial placement of the design. Then, in item 502, the invention identifies one or more clusters of clock elements (e.g., latches) that are to be driven by common clock nets. Then, the invention reconnects the clock nets to form the clusters, as shown in item 504. Next, in item 506, the invention moves the clock elements in each identified cluster closer together. In item 508, the invention arranges the latches in a pattern (e.g., columns) that is most beneficial to the overall circuit layout. Then, in item 510, the invention determines whether the moved clock elements still have legal placement. If not, the cluster is moved as a whole to make the placement legal, as shown in item 512.

While the overall methodology of the invention is described above, the invention can be embodied in any number of different types of systems and executed in any number of different ways, as would be known by one ordinarily skilled in the art. For example, as illustrated in FIG. 6, a typical hardware configuration of an information handling/computer system in accordance with the invention preferably has at least one processor or central processing unit (CPU) 600. For example, the central processing unit 600 could include various image/texture processing units, mapping units, weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, filtering, adding, subtracting, comparing, etc.

The CPU 600 is interconnected via a system bus 601 to a random access memory (RAM) 602, read-only memory (ROM) 603, input/output (I/O) adapter 604 (for connecting peripheral devices such as disk units 605 and tape drives 606 to the bus 601), communication adapter 607 (for connecting an information handling system to a data processing network) user interface adapter 608 (for connecting peripherals 609–610 such as a keyboard, mouse, imager, microphone, speaker and/or other interface device to the bus 601), a printer 611, and display adapter 612 (for connecting the bus 601 to a display device 613). The invention could be implemented using the structure shown in FIG. 6 by including the inventive method, described above, within a computer program stored on the storage device 605. Such a computer program would act on an image supplied through the interface units 609–610 or through the network connection 607. The system would then automatically segment the textures and output the same on the display 613, through the printer 611 or back to the network 607.

Others have solved the problem by optimizing a clock tree for minimum wire subject to the constraint of fixed latch locations. The invention is better because it allows controlled movement of latches to minimize clock power.

The benefits of the invention include reduced power dissipation through latch clustering, and control over the tradeoff between the cost of the latch clustering and the power improvements afforded by it through a cost function controlling the clustering. By clumping logic with latches to be clustered it can also reduce the impact of latch clustering on the delay and power dissipation of data paths connected to the latches.

While the invention has been described in terms of preferred embodiments, those skilled in the art will recognize that the invention can be practiced with modification within the spirit and scope of the appended claims.

What is claimed is:

1. A method of clock optimization comprising:
   creating an initial placement of clock feeding circuits according to clock signal requirements;
   identifying clusters of said clock feeding circuits, wherein each cluster includes a distinct clock signal supply device to which each clock feeding circuit within said cluster is connected;
   changing pin connections between said clock feeding circuits and clock signal supply devices to switch selected ones of said clock feeding circuits to different clusters to reduce lengths of wires between said clock feeding circuits and said clock signal supply devices within each cluster; and
   adjusting positions of said clock feeding circuits within design constraints to further reduce said lengths of said wires.

2. The method in claim 1, wherein said adjusting of said positions of said clock feeding circuits includes moving said clock feeding circuits toward said clock signal supply device of each cluster to a point where a first force pulling each clock feeding circuit toward said clock signal supply device equals a second force pulling said clock feeding circuit toward an original clock feeding circuit location.

3. The method in claim 2, wherein said first force and said second force are derivatives of cost function components.

4. The method in claim 1, wherein the step of identifying said clusters includes identifying subclusters within said clusters, said method further comprising moving said clock feeding circuits toward centroids of said subclusters.

5. The method in claim 4, wherein said adjusting of said positions includes moving each of said subclusters as a group without changing relative positions of said clock feeding circuits within said subclusters.

6. The method in claim 1, wherein said adjusting of said positions includes moving logic devices to minimize a cost function.

7. The method in claim 1, wherein said adjusting includes moving existing circuits to accommodate for said adjusting to reduce local wiring congestion.

8. A method of clock optimization comprising:

creating an initial placement of clock feeding circuits according to clock signal requirements;

identifying clusters of said clock feeding circuits, wherein each cluster includes a distinct clock signal supply device to which each clock feeding circuit within said cluster is connected; and changing pin connections between said clock feeding circuits and clock signal supply devices to switch selected ones of said clock feeding circuits to different clusters to reduce lengths of wires between said clock feeding circuits and said clock signal supply devices within each cluster, wherein said changing is performed so as to minimize a cost function associated with moving said clock feeding circuits from an original clock feeding circuit location.

9. The method in claim 8, further comprising adjusting positions of said clock feeding circuits within design constraints to further reduce said lengths of said wires.

10. The method in claim 9, wherein said adjusting of said positions of said clock feeding circuits includes moving said clock feeding circuits toward said clock signal supply device of each cluster to a point where a first force pulling each clock feeding circuit toward said clock signal supply device equals a second force pulling said clock feeding circuit toward said original clock feeding circuit location.

11. The method in claim 10, wherein said first force and said second force are derivatives of said cost function.

12. The method in claim 9, wherein the step of identifying said clusters includes identifying subclusters within said clusters, said method further comprising moving said clock feeding circuits toward centroids of said subclusters.

13. The method in claim 12, wherein said adjusting of said positions includes moving each of said subclusters as a group without changing relative positions of said clock feeding circuits within said subclusters.

14. The method in claim 9, wherein said adjusting includes moving existing circuits to accommodate for said adjusting to reduce local wiring congestion.

15. A program storage device readable by machine, tangibly embodying a program of instructions executable by the machine to perform a method of clock optimization comprising:

creating an initial placement of clock feeding circuits according to clock signal requirements;

identifying clusters of said clock feeding circuits, wherein each cluster includes a distinct clock signal supply device to which each clock feeding circuit within said cluster is connected; and changing pin connections between said clock feeding circuits and clock signal supply devices to switch selected ones of said clock feeding circuits to different clusters to reduce lengths of wires between said clock feeding circuits and said clock signal supply devices within each cluster, wherein said changing is performed so as to minimize a cost function associated with moving said clock feeding circuits from an original clock feeding circuit location.

16. The program storage device in claim 15, further comprising adjusting positions of said clock feeding circuits within design constraints to further reduce said lengths of said wires.

17. The program storage device in claim 16, wherein said adjusting of said positions of said clock feeding circuits includes moving said clock feeding circuits toward said clock signal supply device of each cluster to a point where a first force pulling each clock feeding circuit toward said clock signal supply device equals a second force pulling said clock feeding circuit toward said original clock feeding circuit location.

18. The program storage device in claim 17, wherein said first force and said second force are derivatives of said cost function.

19. The program storage device in claim 16, wherein the step of identifying said clusters includes identifying subclusters within said clusters, said method further comprising moving said clock feeding circuits toward centroids of said subclusters.

20. The program storage device in claim 19, wherein said adjusting of said positions includes moving each of said subclusters as a group without changing relative positions of said clock feeding circuits within said subclusters.

21. The program storage device in claim 16, wherein said adjusting includes moving existing circuits to accommodate for said adjusting to reduce local wiring congestion.

* * * * *